United States Patent
Heinzman

(10) Patent No.: US 10,030,078 B2
(45) Date of Patent: *Jul. 24, 2018

(54) PROCESS FOR MOLECULAR WEIGHT REDUCTION OF ETHERSUCCINYLATED POLYSACCHARIDES

(71) Applicant: The Procter & Gamble Company, Cincinnati, OH (US)

(72) Inventor: Stephen Wayne Heinzman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/046,500

(22) Filed: Feb. 18, 2016

(65) Prior Publication Data

US 2016/0159932 A1 Jun. 9, 2016

Related U.S. Application Data

(60) Provisional application No. 62/120,029, filed on Feb. 24, 2015.

(51) Int. Cl.
| | | |
|---|---|---|
| *C08B 31/16* | (2006.01) | |
| *C08B 13/00* | (2006.01) | |
| *C08B 37/08* | (2006.01) | |

(52) U.S. Cl.
CPC .............. *C08B 31/16* (2013.01); *C08B 13/00* (2013.01); *C08B 37/003* (2013.01); *Y02P 20/582* (2015.11)

(58) Field of Classification Search
CPC ........ C08B 31/16; C08B 37/003; C08B 13/00
USPC ....................................... 536/108
See application file for complete search history.

(56) References Cited

U.S. PATENT DOCUMENTS

| | | | |
|---|---|---|---|
| 2,801,241 A | 7/1957 | Hobbs | |
| 3,655,644 A | 4/1972 | Muscatine | |
| 3,702,847 A | 11/1972 | Hathaway | |
| 3,839,320 A | 10/1974 | Bauer | |
| 4,017,460 A | 4/1977 | Tessler | |
| 4,119,477 A | 10/1978 | Cohen et al. | |
| 4,332,935 A | 6/1982 | Fischer et al. | |
| 5,328,565 A | 7/1994 | Rasch et al. | |
| 5,342,225 A | 8/1994 | Farr | |
| 5,514,792 A * | 5/1996 | Knipper | C08B 37/006 435/101 |
| 5,789,570 A | 8/1998 | Buchholz et al. | |
| 5,843,279 A | 12/1998 | Phan et al. | |
| 6,036,730 A * | 3/2000 | Yoshida | A61K 8/645 8/405 |
| 6,670,470 B1 | 12/2003 | Ketola et al. | |
| 6,709,526 B1 | 3/2004 | Bailey et al. | |
| 7,365,190 B2 | 4/2008 | Couture et al. | |
| 2005/0070738 A1 * | 3/2005 | Isotani | C07C 51/02 562/608 |
| 2005/0229925 A1 | 10/2005 | Ketola | |
| 2010/0298497 A1 | 11/2010 | Heinzman | |

FOREIGN PATENT DOCUMENTS

| | | |
|---|---|---|
| CN | 1078211 | 1/2002 |
| EP | 1217107 B1 | 5/2005 |
| EP | 1217106 B1 | 11/2005 |
| WO | WO 93/01217 A1 | 1/1993 |
| WO | WO 9301217 | 1/1993 |
| WO | WO 03/066942 A1 | 8/2003 |

OTHER PUBLICATIONS

International Search Report dated Jun. 24, 2016—6 pages.
All US Office Actions, U.S. Appl. No. 11/411,334, (P&G Case 10020M)—now U.S. Pat. No. 7,772,391.
All US Office Actions, U.S. Appl. No. 12/850,721, (P&G Case 10020MC)—now U.S. Pat. No. 8,049,004.
Geffroy, et al., "Molar Mass Selectivity in the Absorption of Polyacrylates on Calcite". Physicochemical and Engineering Aspects, vol. 162, pp. 107-121 (2000).
Othmer, *Encyclopedia of Chemical Technology*, 4th Edition, vol. 22, pp. 699-719, 1997.
Pourdeyhimi, et al., "Measuring Fiber Diameter Distribution in Nonwovens", *Textile Res. J.*, 69(4), pp. 233-236, 1999.
Carvalho, et al. "Thermoplastic starch modification during melt processing: Hydrolysis catalyzed by carboxylic acids", Carbohydrate Polymers, vol. 62, pp. 387-390, 2005.
Da Roz, et al., "Thermoplastic starch modified during melt processing with organic acids: The effect of molar mass on thermal and mechanical properties", Industrial Crops and Products, vol. 33, pp. 152-157, 2011.

* cited by examiner

*Primary Examiner* — Shaojia Anna Jiang
*Assistant Examiner* — Michael C Henry
(74) *Attorney, Agent, or Firm* — C. Brant Cook

(57) ABSTRACT

Processes for making reduced molecular weight ethersuccinylated polysaccharides, for example ethersuccinylated starches are provided.

17 Claims, 1 Drawing Sheet

PROCESS FOR MOLECULAR WEIGHT REDUCTION OF ETHERSUCCINYLATED POLYSACCHARIDES

FIELD OF THE INVENTION

The present invention relates to processes for making reduced molecular weight ethersuccinylated polysaccharides, such as ethersuccinylated starch.

BACKGROUND OF THE INVENTION

Covalently attaching substituents to polysaccharides, for example hydroxyethyl, hydroxypropyl, and methyl, is well known as a way to modify various properties of the polysaccharide including solubility, viscosity, film formation, suspension of solids, and adhesiveness. Substituents which have carboxyl groups, for example carboxymethyl, can have additional properties including emulsion stabilization, binding of cationic species, crystal growth inhibition, and increasing the compatibility with other polymers. The carboxyl group can also be used to crosslink the ethersuccinylated polysaccharides either by formation of ester links or by ionic crosslinks between carboxyl groups. Such crosslinked ethersuccinylated polysaccharides can swell rapidly in water to form strong hydrogels. Substituents which are linked to the polysaccharides via an ether linkage, for example carboxymethyl, hydroxyethyl, hydroxypropyl, and methyl are advantageous since the ether linkage is stable under both acidic and basic pH conditions. Ethersuccinate is a substituent which contains both carboxyl groups and an ether linkage to the polysaccharide.

For some applications, a solution of ethersuccinylated polysaccharides at their native molecular weight has a much higher viscosity than desired. A typical reaction to reduce the molecular weight of polysaccharides is acid hydrolysis. In the case of starch this involves suspending the starch granules in a strong acid (hydrochloric or sulfuric acid) solution (pH approximately 0.75) at 40-55° C. for 12-14 hours. The granule suspension is then neutralized and filtered to remove the salt generated; the presence of salt can interfere with some applications. Over the course of the acid hydrolysis reaction a portion of the starch granule is solubilized and is removed in the filtrate thus reducing the yield of the conversion. The portion of starch solubilized becomes larger as the molecular weight target is lowered. Finally the reduced molecular weight starch granules are heated in water to provide a starch solution. Because of the low pH of the acid hydrolysis, it is not possible to include acid labile components, such as an enzyme to remove residual protein, during this step, thus another step is required for their inclusion.

In summary, existing processes for making reduced molecular weight substituted polysaccharides requires two steps. The first step is usually to react a native polysaccharide, for example a starch granule, with a derivatizing agent (i.e. ethylene oxide) to form a substituted polysaccharide (i.e., hydroxyethyl polysaccharide). A second step to reduce the molecular weight is then performed by reacting the substituted polysaccharide with a strong acid for long times, for example 12 or more hours, to finally obtain a reduced weight average molecular weight substituted polysaccharide. Alternatively, in the first step the native polysaccharide can be reduced in molecular weight by acid thinning the native polysaccharide to produce a reduced weight average molecular weight polysaccharide followed by a second step of reacting the reduced molecular weight polysaccharide with a derivatizing agent. In either case, strongly acidic, corrosive conditions are needed and salt is generated, which must be removed. Such acidic, corrosive conditions and salts are problematic and undesirable.

Accordingly, there is a need for a process which reduces the molecular weight of ethersuccinylated polysaccharides, for example ethersuccinylated starch, with high conversion, without the need to remove salt, without low pH (acidic) reaction conditions which are corrosive, while providing a solution of reduced molecular weight ethersuccinylated polysaccharide, optionally, in the presence of low pH sensitive components.

SUMMARY OF THE INVENTION

The present invention fulfills the needs described above by providing a process for making reduced molecular weight ethersuccinylated polysaccharides with high conversion, with minimum salt contamination, without corrosive low pH (acidic) reaction conditions and much shorter reaction times and solutions comprising such reduced molecular weight ethersuccinylated polysaccharides.

In one example of the present invention, a process for making an ethersuccinylated polysaccharide, for example a reduced molecular weight ethersuccinylated polysaccharide, such as reduced molecular weight ethersuccinylated starch, wherein the process comprises the step of reacting an ethersuccinylated polysaccharide (a precursor or starting ethersuccinylated polysaccharide, in one example the ethersuccinylated polysaccharide is derived from an unmodified polysaccharide, such as an unmodified polysaccharide comprising native corn starch) with an acid, such as an acid capable of forming a water-soluble salt within the reaction mixture, for example a water-soluble salt comprising a cation selected from the group consisting of: calcium, sodium, ammonium, and mixtures thereof, to achieve a pH of the reaction mixture of from about 2 to about 6 and/or from about 2.5 to about 6 and/or from about 2.5 to about 5 and/or from about 3 to about 5 and/or from about 3.5 to about 5 and/or from about 4 to about 5 under conditions (for example time and/or temperature conditions depending upon the desired ultimate molecular weight) that produce at least a partially protonated or fully protonated reduced molecular weight ethersuccinylated polysaccharide (in other words, a reduced molecular weight ethersuccinylated polysaccharide that exhibits a reduced molecular weight compared to the precursor or starting ethersuccinylated polysaccharide as measured according to the Molecular Weight Test Method described herein), is obtained, is provided. The process may optionally include the step of removing, for example by filtration, at least a portion and/or substantially all and/or all of any salt present in the reaction mixture (which may have been generated during the acidification step).

In one example, the acid reacted with the ethersuccinylated polysaccharide is selected from the group consisting of: hydrochloric acid, acetic acid, maleic acid, carbonic acid, nitric acid, and mixtures thereof.

In another example of the present invention, a process for making a reduced molecular weight ethersuccinylated polysaccharide comprising an ethersuccinate moiety having the formula:

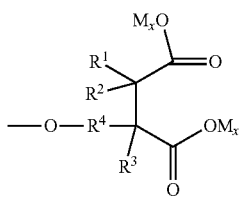

wherein $R^1$, $R^2$, and $R^3$ are independently selected from H, branched or linear $C_1$-$C_4$ alkyl and mixtures thereof; $R^4$ is a $(CH_2)_y$; M is independently selected from H, cations and mixtures thereof; x is greater than 0 but less than or equal to 1; y is 0 or 1; at a lower (reduced) molecular weight (as measured according to the Molecular Weight Test Method described herein) than a native polysaccharide from which the reduced molecular weight ethersuccinylated polysaccharide is obtained, the process comprising the steps of a) reacting a native polysaccharide, for example an unmodified polysaccharide, with an α, β-unsaturated dicarboxylic acid or salt thereof, for example an alkene dicarboxylic acid or salt thereof, such as maleic acid, itaconic acid, citraconic acid, and mixtures thereof, to produce an ethersuccinylated polysaccharide; and b) reacting the ethersuccinylated polysaccharide with an acid to achieve a pH of the reaction mixture of from about 2 to about 6 and/or from about 2.5 to about 6 and/or from about 2.5 to about 5 and/or from about 3 to about 5 and/or from about 3.5 to about 5 and/or from about 4 to about 5 under conditions (for example time and/or temperature conditions depending upon the desired ultimate molecular weight) that produce at least a partially protonated or fully protonated reduced molecular weight ethersuccinylated polysaccharide (in other words, a reduced molecular weight ethersuccinylated polysaccharide that exhibits a reduced molecular weight compared to the native polysaccharide and/or the ethersuccinylated polysaccharide produced in step a) as measured according to the Molecular Weight Test Method described herein), is obtained is provided.

The step of reacting the unmodified polysaccharide, for example native polysaccharide, with an α, β-unsaturated dicarboxylic acid or salt thereof, may occur in the presence of an alkaline earth metal salt, for example Ca(OH)$_2$.

In yet another example of the present invention, a process for making a reduced molecular weight ethersuccinylated polysaccharide comprising an ethersuccinate moiety having the formula:

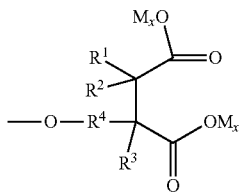

wherein $R^1$, $R^2$, and $R^3$ are independently selected from H, branched or linear $C_1$-$C_4$ alkyl and mixtures thereof; $R^4$ is a $(CH_2)_y$; M is independently selected from H, cations and mixtures thereof; x is greater than 0 but less than or equal to 1; y is 0 or 1; at a lower (reduced) molecular weight (as measured according to the Molecular Weight Test Method described herein) than an ethersuccinylated polysaccharide from which the reduced molecular weight ethersuccinylated polysaccharide is obtained, the process comprising the step of reacting an ethersuccinylated polysaccharide (a precursor or starting ethersuccinylated polysaccharide) with an acid to achieve a pH of the reaction mixture of from about 2 to about 5, for example such that a reduced molecular weight ethersuccinylated polysaccharide (in other words, an ethersuccinylated polysaccharide that exhibits a reduced molecular weight compared to the precursor or starting ethersuccinylated polysaccharide as measured according to the Molecular Weight Test Method described herein) is obtained, is provided.

In still another example of the present invention, a reduced molecular weight ethersuccinylated polysaccharide, for example a reduced molecular weight ethersuccinylated starch, made from a process according to the present invention is provided.

In one example of the present invention, a reduced molecular weight ethersuccinylated polysaccharide, for example a reduced molecular weight ethersuccinylated starch, is provided.

In another example of the present invention, a reduced molecular weight ethersuccinylated polysaccharide comprising an ethersuccinate moiety having the formula:

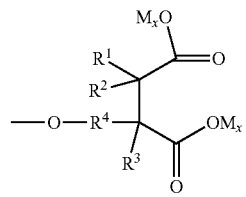

wherein $R^1$, $R^2$, and $R^3$ are independently selected from H, branched or linear $C_1$-$C_4$ alkyl and mixtures thereof; $R^4$ is a $(CH_2)_y$; M is independently selected from H, cations and mixtures thereof; x is greater than 0 but less than or equal to 1; y is 0 or 1; wherein the reduced molecular weight ethersuccinylated polysaccharide exhibits a lower (reduced) molecular weight (as measured according to the Molecular Weight Test Method described herein) than a native polysaccharide from which the reduced molecular weight ethersuccinylated polysaccharide is obtained, is provided.

In yet another example of the present invention, a reduced molecular weight ethersuccinylated polysaccharide comprising an ethersuccinate moiety having the formula:

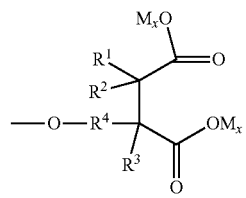

wherein $R^1$, $R^2$, and $R^3$ are independently selected from H, branched or linear $C_1$-$C_4$ alkyl and mixtures thereof; $R^4$ is a $(CH_2)_y$; M is independently selected from H, cations and mixtures thereof; x is greater than 0 but less than or equal to 1; y is 0 or 1; wherein the reduced molecular weight ethersuccinylated polysaccharide exhibits a lower (reduced) molecular weight (as measured according to the Molecular Weight Test Method described herein) than an ethersuccinylated polysaccharide from which the reduced molecular weight ethersuccinylated polysaccharide is obtained, is provided.

In another example of the present invention, a polymer solution comprising a reduced molecular weight ethersuccinylated polysaccharide according to the present invention with a polydispersity less than or equal to 6 and/or less than or equal to 5 as measured according to the Molecular Weight Test Method described herein is provided. In another example of the present invention, a polymer solution comprising: a) a reduced molecular weight ethersuccinylated polysaccharide according to the present invention; and b) a crosslinking system capable of crosslinking the reduced molecular weight ethersuccinylated polysaccharide, is provided.

In even another example of the present invention, a polymer structure, such as a fiber, filament, film, foam and/or coating, comprising a reduced molecular weight ethersuccinylated polysaccharide, for example a crosslinked reduced molecular weight ethersuccinylated polysaccharide, according to the present invention, is provided.

In still another example of the present invention, a fibrous structure comprising a polymer structure, for example a fiber and/or filament, according to the present invention, is provided.

In yet another example of the present invention, a single- or multi-ply sanitary tissue product comprising a polymer structure and/or fibrous structure according to the present invention, is provided.

In still yet another example of the present invention, a process for making a polymer structure according to the present invention, wherein the process comprises the steps of:
a. making a polymer solution comprising:
  i. a reduced molecular weight ethersuccinylated polysaccharide according to the present invention; and
  ii. a crosslinking system capable of crosslinking the polymer; and
b. polymer processing the polymer solution to produce a polymer structure, is provided.

Accordingly, the present invention provides a process which reduces the molecular weight of ethersuccinylated polysaccharides, for example ethersuccinylated starch, with high conversion, uncontaminated by corrosive salts, if desired, without low pH reaction conditions which are corrosive, and provides a solution of reduced molecular weight ethersuccinylated polysaccharide in the presence of low pH sensitive components.

DETAILED DESCRIPTION OF THE INVENTION

Definitions

Figure 1A:
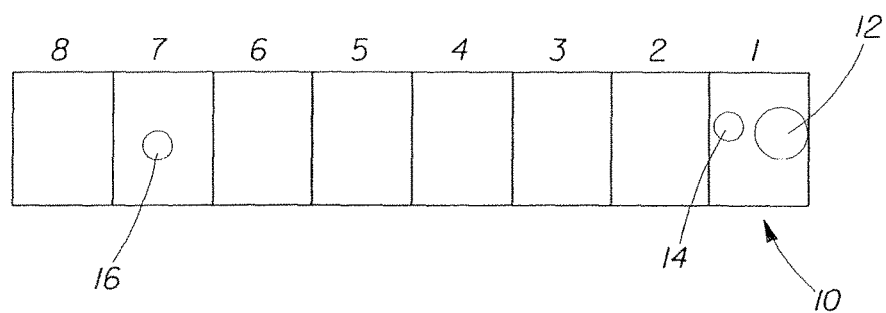
FIG. 1A is a schematic side view of a barrel of a twin screw extruder suitable for use in the present invention.

"Ethersuccinylated polysaccharide" as used herein means a polysaccharide that comprises at least one ethersuccinate moiety. The ethersuccinate moiety may be covalently bonded directly to a carbon atom within the backbone of the polysaccharide.

"Weight average molecular weight", "number average molecular weight", and "polydispersity" as used herein means the weight average molecular weight, number average molecular weight, and polydispersity as determined using gel permeation chromatography according to the Molecular Weight Test Method described herein.

"Reduced molecular weight ethersuccinylated polysaccharide" as used herein means an ethersuccinylated polysaccharide with a weight average molecular weight less than the polysaccharide in its native state.

"Polymer structure" or "polymeric structure" as used herein means any single physical structure produced by a reduced molecular weight ethersuccinylated polysaccharide or polymer solution comprising at least one reduced molecular weight ethersuccinylated polysaccharide. The polymer structures are produced from a reduced molecular weight ethersuccinylated polysaccharide or an ethersuccinylated-containing polymer solution that is polymer processed into the physical structure. The polymer structures may be dry spun and/or solvent spun. "Dry spinning", "dry spun" and/or "solvent spinning", "solvent spun" as used herein unlike wet spinning means that polymer structures are not spun into a coagulating bath.

The polymer structures of the present invention, especially fibers of the present invention, may be produced by crosslinking reduced molecular weight ethersuccinylated polysaccharides together, alone or to other polymers. Non-limiting examples of a suitable crosslinking system for achieving crosslinking comprises a crosslinking agent and optionally a crosslinking facilitator, wherein the reduced molecular weight ethersuccinylated polysaccharide is crosslinked by the crosslinking agent.

A "fibrous structure" as used herein means a single web structure that comprises at least one fiber. For example, a fibrous structure of the present invention may comprise one or more fibers, wherein at least one of the fibers comprises a reduced molecular weight ethersuccinylated polysaccharide structure in fiber form. In another example, a fibrous structure of the present invention may comprise a plurality of fibers, wherein at least one (sometimes a majority, even all) of the fibers comprises a reduced molecular weight ethersuccinylated polysaccharide structure in fiber form. The fibrous structures of the present invention may be layered such that one layer of the fibrous structure may comprise a different composition of fibers and/or materials from another layer of the same fibrous structure.

The polymer structures in fiber, fibrous structure, film and/or foam form may be incorporated into sanitary tissue products and/or other paper-like products, such as writing papers, cores, such as tissue product cores, packaging films, and packaging peanuts.

One or more polymer structures of the present invention may be incorporated into a multi-polymer structure product.

"Sanitary tissue product" as used includes but is not limited to a wiping implement for post-urinary and post-bowel movement cleaning (toilet tissue), for otorhinolaryngological discharges (facial tissue), and multi-functional absorbent, cleaning uses (absorbent towels), wipes, feminine care products and diapers.

"Ply" or "Plies" as used herein means a single fibrous structure optionally to be disposed in a substantially contiguous, face-to-face relationship with other plies, forming a multi-ply sanitary tissue product. It is also contemplated that a single fibrous structure can effectively form two "plies" or multiple "plies", for example, by being folded on itself. Ply or plies can also exist as films or other polymer structures.

One or more layers may be present in a single ply. For example, two or more layers of different compositions may form a single ply. In other words, the two or more layers are substantially or completely incapable of being physically separated from each other without substantially damaging the ply.

"Fiber" as used herein means a slender, thin, and highly flexible object having a major axis which is very long, compared to the fiber's two mutually-orthogonal axes that are perpendicular to the major axis. In one example, an aspect ratio of the major's axis length to an equivalent diameter of the fiber's cross-section perpendicular to the major axis is greater than 100/1, more specifically greater than 500/1, and still more specifically greater than 1000/1, and even more specifically, greater than 5000/1.

The fibers of the present invention may be continuous or substantially continuous. A fiber is continuous if it extends 100% of the MD length of the fibrous structure and/or fibrous structure and/or sanitary tissue product made therefrom. In one embodiment, a fiber is substantially continuous if it extends greater than about 30% and/or greater than about 50% and/or greater than about 70% of the MD length of the fibrous structure and/or sanitary tissue product made therefrom.

The fiber can have a fiber diameter as determined by the Fiber Diameter Test Method described herein of less than about 50 microns and/or less than about 20 microns and/or less than about 10 microns and/or less than about 8 microns and/or less than about 6 microns.

The fibers may include melt spun fibers, dry spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

"Capillary Number" as used herein is a number representing the ratio of the viscous fluid forces to surface tension forces. Near the exit of a capillary die, if the viscous forces are not significantly larger than the surface tension forces, the fluid filament will break into droplets, which is commonly termed "atomization." The Capillary Number is calculated according to the following equation:

$$Ca = (\eta_s \cdot Q)/(\pi \cdot r^2 \cdot \sigma)$$

where $\eta_s$ is the shear viscosity in Pascal·seconds measured at a shear rate of 3000 s$^{-1}$; Q is the volumetric fluid flow rate through capillary die in m$^3$/s; r is the radius of the capillary die in meters (for non-circular orifices, the equivalent diameter/radius can be used); and $\sigma$ is the surface tension of the fluid in Newtons per meter.

Ethersuccinylated Polysaccharides

Polysaccharides in accordance with the present invention are a) capable of being at least partially solubilized or swelled in water in order that they can undergo reaction with a butanedioic acid reactant and/or b) stable to the alkaline reaction condition.

Non-limiting examples of polysaccharides, for example unmodified polysaccharides, suitable as precursors for the process of the present invention include starch, starch derivatives, chitosan, chitosan derivatives, cellulose, cellulose derivatives such as cellulose ether and ester derivatives, gums, arabinans, galactans, galactomannans, and various other polysaccharides and mixtures thereof. In one example, the unmodified polysaccharide is selected from the group consisting of: starch, chitosan, cellulose, and mixtures thereof.

Well known modifications of polysaccharides, such as natural starches, include chemical modifications and/or enzymatic modifications. For example, the natural starch can be hydroxy-ethylated, hydroxy-propylated, and/or oxidized. In addition, the polysaccharide may comprise dent corn starch.

The ethersuccinate moiety may be substituted on any of the hydroxyl groups present in the polysaccharide to result in the ethersuccinylated polysacccharide. For example, the ethersuccinate moiety may be substituted on the most acidic and/or least sterically hindered hydroxyl groups. Preferential substitution may be occurring on the hydroxyl attached to the carbon adjacent to the glucoside carbon.

In one example, the percentage of hydroxyls substituted with ethersuccinate moieties may range from 0.1% to 99%.

In another example, the polysaccharide may have other substituents, in addition to the ethersuccinate moiety.

A. Starch

Precursor natural starch and/or modified starch-based polymer and/or oligomer materials, modified amylose (represented by Structure I below) and/or modified amylopectin (represented by Structure II below) both of which are described in Kirk-Othmer's *Encyclopedia of Chemical Technology* 4$^{th}$ Edition, Vol. 22, pp. 701-703, starch, generally, is described at pp. 699-719, which are suitable for use as the hydroxyl polymers of the present invention can be characterized by the following general structures, alone or in combination:

Structure I

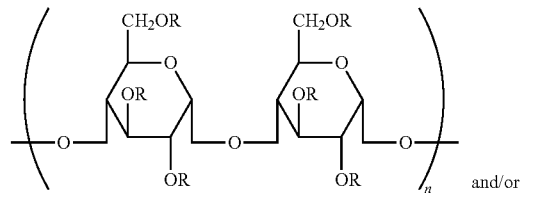

and/or

Structure II

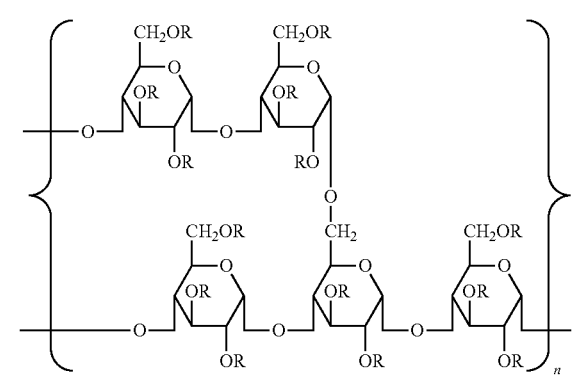

wherein each R is selected from the group consisting of $R_a$, $R_c$, and $R_p$, wherein:
each $R_a$ is independently selected from the group consisting of H and $C_1$-$C_4$ alkyl;

each $R_c$ is

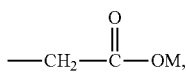

wherein M is a suitable cation selected from the group consisting of $H^+$, $Na^+$, $K^+$, $1/2Ca^{2+}$, $1/2Mg^{2+}$, barium, zinc and lanthanum (III), or $^+NH_jR_k$ wherein j and k are independently from 0 to 4 and wherein j+k is 4 and R in this formula is any moiety capable of forming a cation, such as methyl and/or ethyl group or derivative;

each $R_p$ is

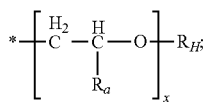

each $R_H$ is independently selected from the group consisting of $R_a$ and $R_c$ each x is from 1 to about 5;

n is a number that results in the polymer having a weight average molecular weight in accordance with the present invention.

In one example, the precursor starch is unsubstituted and thus R equals H in Structures I and II. After the ethersuccinylation reaction is carried out on the precursor starch, R is selected from the group consisting of $R_a$, $R_c$, $R_p$, and $R_E$; wherein:

each $R_E$ is

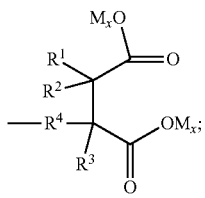

each $R_H$ is independently selected from the group consisting of $R_a$, $R_c$, and $R_E$.

The "Degree of Substitution" ("DS") for group $R_E$, which is sometimes abbreviated herein "$DS_E$", means the number of moles of group $R_E$ components that are substituted per anhydrous glucose unit, wherein an anhydrous glucose unit is a six membered ring as shown in the repeating unit of the general structure above.

The "Degree of Substitution" for group $R_c$, which is sometimes abbreviated herein "$DS_c$", means the number of moles of group $R_c$ components that are substituted per anhydrous D-glucose unit, wherein an anhydrous D-glucose unit is a six membered ring as shown in the repeating unit of the general structures above.

A natural starch can be modified chemically or enzymatically, as well known in the art. For example, the natural starch can be hydroxy-ethylated or hydroxy-propylated or oxidized. Though all starches are potentially useful herein, the present invention can be beneficially practiced with high amylose natural starches (starches that contain greater than 25% and/or greater than 50% and/or greater than 65% and/or greater than 70% and/or about 85% amylose) derived from agricultural sources, which offer the advantages of providing polymeric structures with superior material properties as compared to starches containing lower amounts of amylose.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, acetyl, or carbamate starches or mixtures thereof can be used as chemically modified starches. The degree of substitution of the chemically modified starch is from 0.05 to 3.0, and more specifically from 0.05 to 0.2. If the derivatives are sensitive to alkaline conditions, for example esters, then such derivatization must be carried out after the ethersuccinylation reaction. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

The precursor starch could have a weight average molecular weight lower than native starch, be ethersuccinylated and then have its weight average molecular weight further reduced in the process of the present invention. The degree of ethersuccinate substitution can be varied according to the application; the greater the substitution, the less the retrogradation compared to the native, unsubstituted starch. Retrogradation occurs more readily with starches with high amylose contents and so ethersuccinylation of high amylose starches is particularly beneficial to prevent retrogradation.

B. Cellulose

Cellulose and modified cellulose-based polymer and/or oligomer materials, (represented by Structure III below which are suitable for use as the hydroxyl polymers of the present invention can be characterized by the following general structures, alone or in combination:

Structure III

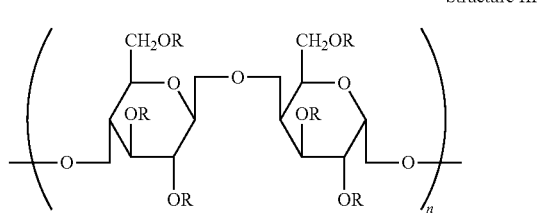

wherein each R is selected from the group consisting of $R_a$, $R_c$, and $R_p$;

wherein:

each $R_a$ is independently selected from the group consisting of H and $C_1$-$C_4$ alkyl;

each $R_c$ is

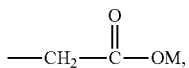

wherein M is a suitable cation selected from the group consisting of $H^+$, $Na^+$, $K^+$, $1/2Ca^{2+}$, $1/2Mg^{2+}$, barium, zinc and lanthanum (III), or $^+NH_jR_k$ wherein j and k are independently from 0 to 4 and wherein j+k is 4 and R in this formula is any moiety capable of forming a cation, such as methyl and/or ethyl group or derivative;

each $R_p$ is

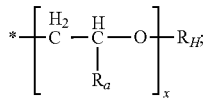

each $R_H$ is independently selected from the group consisting of $R_a$ and $R_c$ each x is from 1 to about 5;

n is a number that results in the polymer having a weight average molecular weight in accordance with the present invention.

In one example, the precursor cellulose hydroxyl polymer is unsubstituted and thus R equals H in Structure III. After the ethersuccinylation reaction is carried out R is selected from the group consisting of $R_a$, $R_c$, $R_p$, and $R_E$;

wherein:

each ethersuccinate $R_E$ is

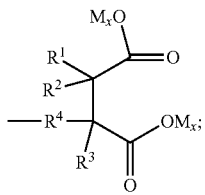

and each $R_H$ is independently selected from the group consisting of $R_a$, $R_c$, and $R_E$.

The "Degree of Substitution" for group $R_E$, which is sometimes abbreviated herein "$DS_E$", means the number of moles of group $R_E$ components that are substituted per anhydrous glucose unit, wherein an anhydrous glucose unit is a six membered ring as shown in the repeating unit of the general structure above.

The "Degree of Substitution" for group $R_C$, which is sometimes abbreviated herein "$DS_C$", means the number of moles of group $R_C$ components that are substituted per anhydrous D-glucose unit, wherein an anhydrous D-glucose unit is a six membered ring as shown in the repeating unit of the general structures above.

C. Other Polysaccharides

"Polysaccharides" herein means natural polysaccharides and polysaccharide derivatives or modified polysaccharides. Suitable other polysaccharides include, but are not limited to, chitosan, chitosan derivatives, gums, arabinans, galactans and mixtures thereof.

The polysaccharides can be extracted from plants, produced by organisms, such as bacteria, fungi, prokaryotes, eukaryotes, extracted from animals and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 1-4, 1-6, 2-3 and mixtures thereof.

It is desirable that the polysaccharides of the present invention have a weight average molecular weight in the range of from about 2,000 to about 10,000,000, more and/or from about 500,000 to about 5,000,000, and/or from about 1,000,000 to about 5,000,000 g/mol.

In one example, the polysaccharide is selected from the group consisting of: tamarind gum (containing xyloglucan polymers), guar gum, chitosan, chitosan derivatives, locust bean gum (containing galactomannan polymers), and other industrial gums and polymers, which include, but are not limited to, Tara, Fenugreek, Aloe, Chia, Flaxseed, *Psyllium* seed, quince seed, xanthan, gellan, welan, rhamsan, dextran, curdlan, pullulan, scleroglucan, schizophyllan, chitin, hydroxyalkyl cellulose, arabinan (such as from sugar beets), de-branched arabinan (such as from sugar beets), arabinoxylan (such as from rye and wheat flour), galactan (such as from lupin and potatoes), pectic galactan (such as from potatoes), galactomannan (such as from carob, and including both low and high viscosities), glucomannan, lichenan (such as from icelandic moss), mannan (such as from ivory nuts), pachyman, rhamnogalacturonan, acacia gum, agar, alginates, carrageenan, chitosan, clavan, hyaluronic acid, heparin, inulin, cellodextrins, and mixtures thereof. These polysaccharides can also be treated (such as enzymatically) so that the best fractions of the polysaccharides are isolated.

The natural polysaccharides can be modified with amines (primary, secondary, tertiary), amides, esters, ethers, alcohols, carboxylic acids, tosylates, sulfonates, sulfates, nitrates, phosphates and mixtures thereof. Such a modification can take place in position 2, 3 and/or 6 of the glucose unit. If the derivatives are sensitive to alkaline conditions, for example esters, then such derivatization must be carried out after the ethersuccinylation reaction. Such modified or derivatized polysaccharides can be included in the compositions of the present invention in addition to the natural polysaccharides.

Non-limiting examples of such modified polysaccharides include: carboxyl and hydroxymethyl substitutions (e.g., glucuronic acid instead of glucose); amino polysaccharides (amine substitution, e.g., glucosamine instead of glucose); $C_1$-$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, amine functionalized cellulose-like O-methyl-(N-1,12-dodecanediamine) cellulose, biotin heparin, carboxymethylated dextran, guar polycarboxylic acid, carboxymethylated locust bean gum, carboxymethylated xanthan, chitosan phosphate, chitosan phosphate sulfate, diethylaminoethyl dextran, dodecylamide alginate, and mixtures thereof.

The polysaccharides can be linear, like in hydroxyalkylcellulose, the polymer can have an alternating repeat like in carrageenan, the polymer can have an interrupted repeat like in pectin, the polymer can be a block copolymer like in alginate, the polymer can be branched like in dextran, the polymer can have a complex repeat like in xanthan. Descriptions of the polymer definitions are give in "An introduction to Polysaccharide Biotechnology", by M. Tombs and S. E. Harding, T.J.Press 1998.

Polymer Solution

The polymer solution may have a temperature of from about 50° C. to about 100° C. and/or from about 65° C. to about 95° C. and/or from about 70° C. to about 90° C. when making fibers from the polymer solution. The polymer solution temperature is generally higher when making film and/or foam polymer structures, as described below.

The pH of the polymer solution may be from about 2.5 to about 9 and/or from about 3 to about 8.5 and/or from about 3.2 to about 8 and/or from about 3.2 to about 7.5.

The polymer solution may exhibit a Capillary Number of at least 1 and/or at least 3 and/or at least 5 such that the polymer solution can be effectively polymer processed into a polymer structure, such as a fiber. In one example, the polymer solution exhibits a Capillary Number of from at least 1 to about 50 and/or at least 3 to about 50 and/or at least 5 to about 30. Further, the polymer solution may exhibit a pH of from at least about 4 to about 12 and/or from at least about 4.5 to about 11.5 and/or from at least about 4.5 to about 11.

A crosslinking system may be present in the polymer solution and/or may be added to the polymer solution before polymer processing of the polymer solution. Further, a crosslinking system may be added to the polymer structure after polymer processing the polymer solution.

The crosslinking system of the present invention may further comprise, in addition to the crosslinking agent, a crosslinking facilitator.

"Crosslinking agent" as used herein means any material that is capable of crosslinking a reduced molecular weight polysaccharide within a polymer solution according to the present.

Non-limiting examples of suitable crosslinking agents include polycarboxylic acids, imidazolidinones and other compounds resulting from alkyl substituted or unsubstituted cyclic adducts of glyoxal with ureas, thioureas, guanidines, methylene diamides, and methylene dicarbamates and derivatives thereof and mixtures thereof.

"Crosslinking facilitator" as used herein means any material that is capable of activating a crosslinking agent thereby transforming the crosslinking agent from its unactivated state to its activated state.

Upon crosslinking the reduced molecular weight ethersuccinylated polysaccharide ("RMWESP"), the crosslinking agent becomes an integral part of the polymer structure as a result of crosslinking the reduced molecular weight ethersuccinylated polysaccharide as shown in the following schematic representation:

RMWESP-Crosslinking agent-RMWESP

The crosslinking facilitator may include derivatives of the material that may exist after the transformation/activation of the crosslinking agent. For example, a crosslinking facilitator salt being chemically changed to its acid form and vice versa.

Non-limiting examples of suitable crosslinking facilitators include acids having a pKa of between 2 and 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Non-limiting examples of suitable crosslinking facilitators include acetic acid, benzoic acid, citric acid, formic acid, glycolic acid, lactic acid, maleic acid, phthalic acid, phosphoric acid, succinic acid and mixtures thereof and/or their salts, such as their ammonium salts, such as ammonium glycolate, ammonium citrate, ammonium chloride and ammonium sulfate.

Additional non-limiting examples of suitable crosslinking facilitators include glyoxal bisulfate salts, primary amine salts, such as hydroxyethyl ammonium salts, hydroxypropyl ammonium salt, secondary amine salts, ammonium toluene sulfonate, ammonium benzene sulfonate and ammonium xylene sulfonate.

In another embodiment, the crosslinking system of the present invention may be applied to a pre-existing form as a coating and/or surface treatment.

The polymer solution may comprise a) from about 5% and/or 10% and/or 20% and/or 30% and/or 40% and/or 45% and/or 50% to about 75% and/or 80% and/or 85% and/or 90% and/or 99.5% by weight of the polymer solution of one or more reduced molecular weight ethersuccinylated polysaccharides; b) a crosslinking system comprising from about 0.1% to about 10% by weight of the polymer solution of a crosslinking agent; and c) from about 0% and/or 10% and/or 15% and/or 20% to about 50% and/or 55% and/or 60% and/or 70% by weight of the polymer solution of an external plasticizer e.g., water.

In one example, the polymer solution may comprise two or more different polysaccharides and/or a polysaccharide and a different class of hydroxyl polymer, for example a non-polysaccharide hydroxyl polymer, such as polyvinyl alcohol, at weight ratios of from about 20:1 and/or from about 15:1 and/or from about 10:1 and/or from about 5:1 and/or from about 2:1 and/or from about 1:1 to about 1:20 and/or to about 1:15 and/or to about 1:10 and/or to about 1:5 and/or to about 1:2 and/or to about 1:1.

In another example, the polymer solution comprises from about 0.01% to about 20% and/or from about 0.1% to about 15% and/or from about 1% to about 12% and/or from about 2% to about 10% by weight of a non-polysaccharide hydroxyl polymer, such as a polyvinyl alcohol hydroxyl polymer, and from about 20% to about 99.99% and/or from about 25% to about 95% and/or from about 30% to about 90% and/or from about 40% to about 70% by weight of a polysaccharide, for example a reduced molecular weight ethersuccinylated polysaccharide, such as a reduced molecular weight ethersuccinylated starch.

Non-Limiting Process for Making Reduced Molecular Weight Ethersuccinylated Polysaccharides A non-limiting process for making reduced molecular weight ethersuccinylated polysaccharides of the present invention is set forth below. Even though the following non-limiting example utilizes starch, those of ordinary skill in the art appreciate that other polysaccharides can be ethersuccinylated and their molecular weight reduced in the same or similar manner.

First a native polysaccharide (unmodified) and/or acid thinned polysaccharide is converted into an ethersuccinylated polysaccharide.

In one example, such a process is a high yield process when starch is the precursor polysaccharide. Yields of 70% or greater in the ethersuccinylation step are the norm when starch is the polysaccharide. (Ethersuccinylation yields herein are based on the mol percentage of an α, β-unsaturated dicarboxylic acid or salts, such as maleic acid (a butenedioic acid), feedstock that are converted to ethersuccinate substituents.) The making process can include recycles which can increase the yields further. The ethersuccinylation step provides ethersuccinylated polysaccharides a) with the carboxyl groups partially or wholly in the acid form or partially coordinated to a cation and b) as an easily handled granular solid free of salts such as calcium chloride. The molecular weight reduction step involves suspending the solid ethersuccinylated polysaccharide in water, optionally with other formula components like surfactant, with a selection of reaction conditions. The invention provides the reduced molecular weight ethersuccinylated polysaccharide, for example reduced molecular weight ethersuccinylated starch, as an aqueous melt or solution optionally in the presence of other formula components. In one example of a process for making a reduced molecular weight ethersuccinylated polysaccharide in accordance with the present invention, the components of the ethersuccinylation reaction composition comprise a precursor polysaccharide, an $\alpha$, $\beta$-unsaturated dicarboxylic acid or salts, a cation catalyst and excess base. The components of the molecular reduction step composition comprise water and the ethersuccinylated polysaccharide with a selected portion of the carboxylic groups in the acid form in addition to an acid such that the molecular reduction step composition (reaction mixture) exhibits a pH of from about 2 to about 6 and/or from about 2.5 to about 6 and/or from about 2.5 to about 5 and/or from about 3 to about 5 and/or from about 3.5 to about 5 and/or from about 4 to about 5.

A. Reactor Design and Operating Pressures

The ethersuccinylation step of the invention has no pressure criticality. However, since some polysaccharides, for example cellulose, are more difficult to deprotonate than other polysaccharides, such as starch, it can be advantageous to heat the reaction mixture at temperatures above reflux. A sealed reaction vessel of conventional construction, such as 316 SS (stainless steel) is suitable. This reaction vessel need not be of titanium, nor need it be capable of withstanding high pressures, since the process is not corrosive and operates at low pressures of about 30 psi. Alternatively, a screw extruder can be used which is described below. When the ethersuccinylation reaction is carried out on polysaccharide granules, such as starch granules, a simple, stirred reaction tank can be used which can optionally be blanketed with nitrogen to prevent the a cation catalyst and/or excess base, for example calcium hydroxide, reacting with carbon dioxide in the air.

The molecular weight reduction step described herein can also be conducted in a simple, stirred reaction tank, if the polysaccharide concentration is low, for example concentration of less than 20% and/or less than 15% and/or less than 10%, and the viscosity is low enough. If a higher concentration, for example from about 20 to 35% and/or from about 25-30%, of reduced molecular weight ethersuccinylated polysaccharide and a shorter reaction time is desired, the use of a jet cooker or scraped wall reactor is suitable. If a very high concentration, for example greater than 35%, of reduced molecular weight ethersuccinylated polysaccharide is desired, a screw extruder which is described below or double Z-blade jacketed reactor can be used since the aqueous polymer melt composition can be viscous.

B. Reaction Temperatures and Times

Reaction temperatures for ethersuccinylation step depend on isolating the ethersuccinylated polysaccharide as an easily handled solid so that removal or recycle of the ethersuccinylation reaction components is possible. In the case of starch granules, the temperatures are from about 40 to about 60° C. and/or from about 50 to about 55° C. Reaction time for reactions carried out in batches is generally measured as of completion of loading of all the components of the ethersuccinate reaction into the reactor and bringing the reaction mixture as rapidly as possible to the reaction temperature. Batch reaction times are from about 2 to about 24 hours.

Reaction temperatures and times for the molecular weight reduction step depend on the choice of reactor design. Batch reaction times are from about 2 to about 24 hours and temperatures are less than 100° C. Reaction temperatures for jet cookers range from 70-150° C. and the starch paste produced is held in plug flow reactor for 5-60 minutes. Reaction time for reactions carried out in extruders or static mixers is generally measured as the residence time in the reactor and this varies from about 30 seconds and/or 1 minute and/or 2 minutes to about 10 minutes and temperatures range from about 100 to about 180° C. Naturally, it will be appreciated that shorter reaction times may be accompanied by selection of higher reaction temperatures within the indicated ranges.

C. Components of the Ethersuccinylation Reaction Mixture (Converting Polysaccharide into Ethersuccinylated Polysaccharide)

The components herein are the polysaccharide, for example native polysaccharide, (as described above), an acid or salt thereof, such as an $\alpha$, $\beta$-unsaturated dicarboxylic acid or salts, a cation catalyst, excess base, and water. The $\alpha$, $\beta$-unsaturated dicarboxylic acid or salts may be in organic acid form and both the cation catalyst and excess base can conveniently be provided simultaneously, for example as calcium hydroxide. Alternatively, it is possible to adjust the amounts of each of the components independently.

In general, the molar ratio of the $\alpha$, $\beta$-unsaturated dicarboxylic acid or salts component to the polysaccharide depends on the properties desired from the ethersuccinylated polysaccharide. For example, if viscosity modification can be achieved with a low $DS_E$ of 0.03, then the ratio of $\alpha$, $\beta$-unsaturated dicarboxylic acid or salts component to polysaccharide monomer unit to form that particular $DS_E$ would need to be somewhat higher than 0.03 depending on the yield. If the property of cation binding requires a higher $DS_E$, for example 0.6, then the ratio of $\alpha$, $\beta$-unsaturated dicarboxylic acid or salts component to polysaccharide monomer unit would need to be between 0.66 and 1.2.

In general, the molar ratio of the cation catalyst to the $\alpha$, $\beta$-unsaturated dicarboxylic acid or salts component is at least 0.5 and/or greater than 1.0 and/or greater than 2.0. Most important after having at least 0.5 molar ratio of cation catalyst to unsaturated dicarboxylic acid is that enough cation catalyst be added to bring the ethersuccinylation reaction pH to at least 11, and/or greater than 11.2, and/or greater than 11.3, and preferably between 11.3 and 12.3. In the case of starch this requires excess dibasic cation catalyst; for example calcium hydroxide ($Ca(OH)_2$), between 0.2 mmol and 0.8 mmol of cation catalyst per gram of starch. Excess cation catalyst is defined as the amount of catalyst in excess of what is needed to neutralize the butanedioic acid. For example to make 1 mol of 0.001 $DS_E$ starch, 0.0014 mol maleic anhydride, 0.0972 mol of calcium hydroxide.

In general, water is from about 30 to about 90 wt. % and/or from about 55 to about 65 wt % of the reaction mixture. It is advantageous to use the starch slurry at the concentration achieved from wet milling process prior to drying.

D. Chemical and Physical Forms of the Reaction Components

Suitable polysaccharides are described in the Definitions. The list of useful $\alpha$, $\beta$-unsaturated dicarboxylic acid or salts reactants includes maleic anhydride, maleic acid, citraconic anhydride, citraconic acid, itaconic anhydride, and itaconic acid. The list of cation catalysts include calcium, magnesium, barium, zinc and lanthanum (III). In general, the chemical form of the cation catalysts will be that of oxide or hydroxide such as calcium oxide, calcium hydroxide, magnesium oxide, magnesium hydroxide or the like, or inert anion salts. The cation catalyst may be present in the butanedioic acid reactant, for example, in the production of itaconic and citraconic acid via fermentation each material is isolated from the broth as a calcium salt and that salt could be used directly in the ethersuccinylation process. For purposes of neutralizing the α, β-unsaturated dicarboxylic acid or salts reactant, salts such as calcium carbonate may be used. The excess base may be provided by the cation catalyst or by alkali hydroxides such as sodium hydroxide or potassium hydroxide. When an ethersuccinylated polysaccharide with a $DS_E$>0.1 is made, it is advantageous to add the maleic acid gradually over the course of the reaction to prevent calcium maleate from precipitating as an insoluble block in the reaction mixture. Process aids for example surfactants and hydrotropes can optionally be used in the processes of the invention.

E. Recycling of Reaction Components

Ethersuccinylation of starch in the granular state provides an opportunity to recycle the α, β-unsaturated dicarboxylic acid or salts component and the cation catalyst. Since calcium maleate is soluble up to 3.21 g per 100 mL of water at 40° C., the granules can be separated by centrifugation or filtration. The calcium maleate remains in the supernatant which can be used in a subsequent reaction. The amount of α, β-unsaturated dicarboxylic acid or salts reactant which is converted to ethersuccinate substituent in the reaction could be added to the reaction mixture, thus forming calcium maleate allowing further recycling of calcium. Alternatively, the reaction mixture can be acidified with hydrochloric or acetic acid and the granules separated by centrifugation or filtration. Maleic acid and either calcium chloride or calcium acetate remain in the supernatant which can be used in a subsequent reaction. The ethersuccinylated polysaccharide is also converted to the completely protonated or to a partial protonated, partial calcium form in this way. The ratio of carboxylic acids to carboxylates will depend on the reaction time and temperature for the molecular weight reduction step. If the ethersuccinylated polysaccharide, for example ethersuccinylated starch, is in the fully acid form, ester crosslinks can form between ethersuccinylated polysaccharide molecules, for example ethersuccinylated starch molecules, upon storage which is not desirable for some applications.

In one example the ratio of the mmoles of excess cation catalyst, such as calcium hydroxide (an alkaline earth metal salt), (as determined by subtracting the mmoles of α, β-unsaturated dicarboxylic acid or salts from the mmoles of the cation catalyst), per gram of polysaccharide, such as starch, is 0.3 mmol/g or greater. (If the cation catalyst only has one hydroxide moiety associated with it, then the ratio values will be doubled.) In another example, the ratio of the mmoles of excess cation catalyst, such as calcium hydroxide, (as determined by subtracting the mmoles of α, β-unsaturated dicarboxylic acid or salts from the mmoles of the cation catalyst), per gram of polysaccharide, such as starch, is from about 0.3 to about 0.7 mmol/g. In another example, the ratio of the moles of cation catalyst, such as calcium hydroxide, to the moles of α, β-unsaturated dicarboxylic acid or salts is greater than about 1.50. Under these examples, the need for additional acid over and above the α, β-unsaturated dicarboxylic acid or salts for this recycling operation to occur is limited or nonexistent.

F. Conversion of the Completely Protonated or Partially Protonated Ethersuccinylated Polysaccharide into Reduced Molecular Weight Ethersuccinylated Polysaccharide Surprisingly, the completely protonated or partially protonated ethersuccinylated polysaccharide, for example as provided or as produced as described herein, can be converted to a reduced molecular weight ethersuccinylated polysaccharide under weakly acidic conditions (pH of from about 2 to about 6). This is in contrast to the pH of 1 or less (stronger acidic) reaction conditions used typically in the industry for acid thinning polysaccharides, for example acid thinning starch. It is thought that acid groups attached to the polysaccharide molecule allow an intramolecular acid hydrolysis of the acetal linkage to occur which is much faster than the intermolecular hydrolysis that occurs in typical acid thinning of polysaccharides, for example starch. Intramolecular hydrolysis also may explain why the polydispersity of the reduced molecular weight ethersuccinylated polysaccharide is typically less than 5 as measured according to the Molecular Weight Test Method. Low polydispersity is an advantage if low molecular weight fragments of polysaccharides are not desirable in the application. The choice of degree of protonation depends on the reaction time and temperature and can be achieved with hydrochloric, acetic or nitric acid, all of which form soluble calcium salts which can be filtered away.

It may also be possible to use carbon dioxide to convert the excess cation catalyst and/or excess base, for example calcium hydroxide, to soluble calcium bicarbonate, which is removed by filtration of the ethersuccinylated polysaccharide. The ethersuccinylated polysaccharide can then be resuspended with the α, β-unsaturated dicarboxylic acid or salts, for example maleic acid, needed for the next reaction to convert the ethersuccinylated polysaccharide to a partially protonated form. The filtrate from the second filtration can be used for the subsequent ethersuccinylation reaction. The filtrate from the first filtration can be heated up to generate calcium carbonate. The calcium carbonate can be heated in a lime kiln to regenerate calcium oxide (CaO). This allows for recycle of the derivatizing reactants within the process.

It may be desirable to leave some of the carboxyl groups coordinated to calcium in which case the amount of acid is chosen to not completely protonate the carboxyl groups. The degree of protonation of a completely protonated or partially protonated can be decreased by the addition of base; ammonium hydroxide is a convenient choice. The completely protonated or partially protonated ethersuccinylated polysaccharide may then be placed in water and/or in an aqueous mixture of stable formula components like surfactant and ammonium salts for selected times and temperatures to form a solution of reduced molecular weight ethersuccinylated polysaccharide. In the case of using an extruder for converting the ethersuccinylated polysaccharide to the reduced molecular weight ethersuccinylated polysaccharide step, it is advantageous to feed the ethersuccinylated polysaccharide in the wet cake form after filtration of the ethersuccinylated granular polysaccharide following the ethersuccinylation step. The reduced molecular weight ethersuccinylated polysaccharide leaving the extruder can be pelletized or ground to form an easily handled solid form in which the reduced molecular weight ethersuccinylated polysaccharide had never been dried, thus reducing energy expenditure.

The pH of the process, for example the reaction mixture of the process, to make reduced molecular weight ethersuccinylated polysaccharide may be from about 2 to about 6 and/or from about 2.5 to about 6 and/or from about 2.5 to about 5 and/or from about 3 to about 5 and/or from about 3.5 to about 5 and/or from about 4 to about 5.

The temperature of the process (reaction), for example the reaction mixture of the process, to make reduced molecular weight ethersuccinylated polysaccharide may be any suitable temperature depending on time so long as a reduced molecular weight ethersuccinylated polysaccharide according to the present invention is produced, for example from about 30° C. to about 170° C. and/or from about 50° C. to about 160° C. and/or from about 50° C. to about 140° C. and/or from about 80° C. to about 140° C. and/or from about 100° C. to about 140° C.

The time of the process (reaction), for example the reaction mixture of the process, to make reduced molecular weight ethersuccinylated polysaccharide may be any suitable time depending on temperature so long as a reduced molecular weight ethersuccinylated polysaccharide according to the present invention is produced, for example from about 30 seconds to less than 12 hours and/or from about 1 minute to about 6 hours and/or from about 1 minutes to about 1 hour and/or from about 1 minute to about 30 minutes and/or from about 1 minute to about 5 minutes.

The reduced molecular weight ethersuccinylated polysaccharides of the present invention, for example at least partially protonated reduced molecular weight ethersuccinylated polysaccharides, of the present invention may exhibit a weight average molecular weight of less than 12,000,000 and/or less than 10,000,000 and/or less than 5,000,000 and/or less than 2,000,000 and/or to about 30,000 and/or to about 50,000 and/or to about 500,000 and/or to about 800,000 and/or to about 1,000,000 g/mol as measured according to the Molecular Weight Test Method. In one example, the reduced molecular weight ethersuccinylated polysaccharides of the present invention, for example at least partially protonated reduced molecular weight ethersuccinylated polysaccharides, of the present invention may exhibit a weight average molecular weight of from about 30,000 to about 5,000,000 and/or from about 500,000 to about 2,000,000 and/or from about 800,000 to about 2,000,000 and/or from about 1,000,000 to about 2,000,000 g/mol as measured according to the Molecular Weight Test Method.

NON-LIMITING SYNTHESIS EXAMPLES

Example 1

Synthesis of Fully Protonated Ethersuccinylated Native Corn Starch

Native corn starch 10.74% moisture (150.00 g, 0.84 mol), calcium hydroxide 95% (4.64 g, 0.0627 mol), maleic acid (0.83 g, 0.0072 mol) and water (300 mL) are charged to a jacketed 1 L reactor fitted with a recirculation bath, mechanical stirrer, pH probe, and combination gas inlet/syringe port adapter. The reaction mixture is kept at 45° C. under nitrogen for 15 hours (pH 11.724) and then brought to about 23° C. 2.5N HCl was added dropwise at about 23° C. to bring the pH to 1.7 (~56 mL). The reaction was filtered, washed with water (3×400 mL) until pH of the filtrate was 4.5; this step removes calcium as calcium chloride. The wet cake was suspended in acetone (200 mL), filtered, washed again with acetone (1×100 mL) and allowed to dry at about 23° C. for 2 days to give an ethersuccinylated native corn starch, 140.3 g, 12.64% moisture. A 3.1920 g aliquot of ethersuccinylated native corn was submitted for acid content determination. The acid content is determined to be 0.093 mmol H/g, the degree of substitution is 0.00757 and the yield is 88% as measured according to the Determination of Acid Content, Degree of Ethersuccinate Substitution, and % Yield Test Method described herein. The mmoles of excess calcium hydroxide per gram of starch is (62.7 mmoles-7.16 mmoles)/150 g=0.37 mmoles/g.

Example 2

Synthesis of Partially Protonated Ethersuccinylated Native Corn Starch

Native corn starch 10.74% moisture (150.00 g, 0.84 mol), calcium hydroxide 95% (4.64 g, 0.0627 mol), maleic acid (0.83 g, 0.0072 mol) and water (300 mL) are charged to a jacketed 1 L reactor fitted with a recirculation bath, mechanical stirrer, pH probe, and combination gas inlet/syringe port adapter. The reaction mixture is kept at 45° C. under nitrogen for 15 hours (pH 11.724) and then brought to about 23° C. 2.5N HCl was added dropwise at about 23° C. to bring the pH to 4.0 (~50 mL). The reaction was filtered, washed with water (3×400 mL) until pH of the filtrate was 4.5; this step removes calcium as calcium chloride. The wet cake was suspended in acetone (200 mL), filtered, washed again with acetone (1×100 mL) and allowed to dry at about 23° C. for 2 days to give an ethersuccinylated native corn starch, 140.3 g, 12.64% moisture. A 3.1920 g aliquot of ethersuccinylated native corn was submitted for acid content determination. The acid content is determined to be 0.093 mmol H/g, the degree of substitution is 0.00757 and the yield is 88% as measured according to the Determination of Acid Content, Degree of Ethersuccinate Substitution, and % Yield Test Method described herein. The mmoles of excess calcium hydroxide per gram of starch is (62.7 mmoles-7.16 mmoles)/150 g=0.37 mmoles/g.

Example 3

Synthesis of Reduced Molecular Weight Ethersuccinylated Corn Starch Via Twin-Screw Extruder The synthesis of Example 1 was scaled-up to provide 600 lbs of fully protonated ethersuccinylated native corn starch with 0.0081 $DS_E$. In a 40:1 APV Baker twin-screw extruder with eight temperature zones, illustrated in FIGS. 1A and 1B and described below, ethersuccinylated corn starch is mixed with 35% ammonium methanesulfonate, 80% Aerosol MA-80-PG surfactant, 1% ammonium hydroxide, and water (added via PREP 100 HPLC pumps (Chrom Tech, Apple Valley Minn.)) in zone 1. Feed rates for each condition are shown in Table 1 below.

TABLE 1

| Condition | Ethersuc. Starch (g/min) | 35% Ammonium methanesulfonate (g/min) | Aerosol MA80 (g/min) | 1% Ammonium hydroxide (g/min) | Water (g/min) |
|---|---|---|---|---|---|
| 2A | 370 | 5.4 | 5.4 | 6.8 | 132 |
| 2B | 372 | 5.4 | 5.7 | 10.8 | 127 |
| 2C | 373 | 5.4 | 5.4 | 0 | 138 |
| 2D | 370 | 5.7 | 5.1 | 5.8 | 132 |
| 2E | 370 | 5.4 | 5.0 | 10.8 | 138 |
| 2F | 371 | 5.1 | 5.1 | 0 | 118 |

This mixture is then conveyed down the barrel through zones 2 through 8 and cooked into a melt-processed reduced molecular weight ethersuccinylated starch composition. The composition in the extruder is 35% water where the make-up of solids is 98% ethersuccinylated corn starch, 1.1% Aerosol MA-80-PG surfactant, and 0.3% ammonium methanesulfonate and the ammonium hydroxide content is varied per condition. The extruder barrel temperature set points for each zone are shown in Table 2 below and are also varied per condition. Samples were taken at the extruder dump and analyzed for molecular weight according to the Molecular Weight Test Method described herein.

TABLE 2

| Condition | 2A | 2B | 2C | 2D | 2E | 2F |
|---|---|---|---|---|---|---|
| Zone 1 Temperature (° F.) | ambient | ambient | ambient | ambient | ambient | ambient |
| Zone 2 Temperature (° F.) | 75 | 75 | 77 | 77 | 77 | 79 |
| Zone 3 Temperature (° F.) | 82 | 82 | 95 | 95 | 95 | 147 |
| Zone 4 Temperature (° F.) | 174 | 174 | 187 | 187 | 187 | 194 |
| Zone 5 Temperature (° F.) | 279 | 279 | 299 | 299 | 299 | 331 |
| Zone 6 Temperature (° F.) | 279 | 279 | 293 | 293 | 293 | 334 |
| Zone 7 Temperature (° F.) | 279 | 279 | 245 | 245 | 245 | 331 |
| Zone 8 Temperature (° F.) | 281 | 280 | 296 | 296 | 296 | 331 |
| Exit Melt Temperature (° F.) | 280 | 281 | 293 | 294 | 295 | 323 |
| Ammonium hydroxide content % of solids | 0.02 | 0.04 | 0 | 0.02 | 0.04 | 0 |
| Molecular Weight (weight average) kDa | 2853.2 | 3726.2 | 1662.1 | 2497.9 | 3491.6 | 580.0 |
| Molecular Weight (number average) kDa | 718.6 | 997.1 | 389.9 | 609.2 | 931.8 | 126.9 |
| Polydispersity | 4.0 | 3.7 | 4.3 | 4.1 | 3.7 | 4.6 |

Description of APV Extruder

A barrel 10 of an APV Baker (Peterborough, England) twin screw extruder is schematically illustrated in FIG. 1A. The barrel 10 is separated into eight zones, identified as zones 1-8. The barrel 10 encloses the extrusion screw and mixing elements, schematically shown in FIG. 1B, and serves as a containment vessel during the extrusion process. A solid feed port 12 is disposed in zone 1 and a liquid feed port 14 is disposed in zone 1. A vent 16 is included in zone 7 for cooling and decreasing the liquid, such as water, content of the mixture prior to exiting the extruder. An optional vent stuffer, commercially available from APV Baker, can be employed to prevent the polymer solution from exiting through the vent 16. The flow of the polymer solution through the barrel 10 is from zone 1 exiting the barrel 10 at zone 8.

Figure 1B:
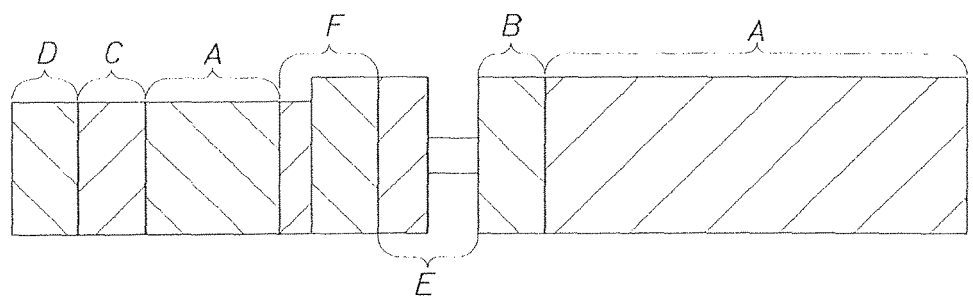
FIG. 1B is a schematic side view of a screw and mixing element configuration suitable for use in the barrel of FIG. 1A.

A screw and mixing element configuration for the twin screw extruder is schematically illustrated in FIG. 1B. The twin screw extruder comprises a plurality of twin lead screws (TLS) (designated A and B) and single lead screws (SLS) (designated C and D) installed in series. Screw elements (A-D) are characterized by the number of continuous leads and the pitch of these leads.

A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and SLS. Screw element A is a TLS with a 1.0 pitch and a 1.5 length ratio. Screw element B is a TLS with a 1.0 pitch and a 1.0 L/D ratio. Screw element C is a SLS with a ¼ pitch and a 1.0 length ratio. Screw element D is a SLS and a ¼ pitch and a ½ length ratio.

Bilobal paddles, E, serving as mixing elements, are also included in series with the SLS and TLS screw elements in order to enhance mixing. Various configurations of bilobal paddles and reversing elements F, single and twin lead screws threaded in the opposite direction, are used in order to control flow and corresponding mixing time.

In zone 1, an ethersuccinylated polysaccharide is fed into the solid feed port using a K-Tron (Pitman, N.J.) loss-in-weight feeder.

The ethersuccinylated polysaccharide is combined inside the extruder (zone 1) with the water, an external plasticizer, added using a Milton Roy (Ivyland, Pa.) diaphragm pump (1.9 gallon per hour pump head) to form a polymer solution. The polymer solution is then conveyed down the barrel of the extruder and cooked.

Table 3 below describes the temperature, pressure, and corresponding function of each zone of the extruder.

TABLE 3

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

Example 4

Synthesis of 0.2 $DS_E$ Ethersuccinylated Corn Starch

Native corn starch 10.74% moisture (150.00 g, 0.84 mol) and water (300 mL) are charged to a jacketed 1 L reactor fitted with a recirculation bath, mechanical stirrer, pH probe, and combination gas inlet/syringe port adapter. Calcium hydroxide 95% (26.68 g, 0.36 mol) was suspended in 100 mL water and added to the starch. The reaction mixture was brought to 50° C. under nitrogen with stirring. Water (200 mL) was added to wash sides of reactor. Maleic acid aqueous 40% solution (75 g, 0.26 mol maleic) was added via syringe pump and needle at 0.25 mL/minute (total addition time 333 minutes). The reaction mixture was kept at 50° C.

under nitrogen for 23 hours after starting the maleic acid addition and then brought to room temperature. The reaction mixture was suction filtered and the precipitate washed with 1500 mL water. The wet cake was transferred to a 2 L beaker with 700 mL methanol and the wet cake suspended. Hydrochloric acid 30% (50 mL) was added to the methanol suspension and stirred for 10 minutes and suction filtered. The precipitate was washed with 200 mL methanol and 200 mL acetone and then transferred to an evaporating dish; wet cake pH 3.0. After drying overnight at about 23° C., the white ethersuccinylated native corn starch 204.94 g, moisture content 9.40%. A 0.5076 g aliquot of ethersuccinylated native corn was submitted for acid content determination. The acid content is determined to be 2.14 mmol H/g, the degree of substitution is 0.20 and the yield is 67% as measured according to the Determination of Acid Content, Degree of Ethersuccinate Substitution, and % Yield Test Method described herein. The mmoles of excess calcium hydroxide per gram of starch is (360 mmoles−260 mmoles)/150 g=0.66 mmoles/g.

Example 5

Synthesis of Reduced Molecular Weight Ethersuccinylated Corn Starch via Stirred Reactor The ethersuccinylated starch product (20.00 g) of Example 4 and water (300 g) was charged to a water jacketed 1 L reactor fitted with a mechanical stirrer. The reaction mixture was kept at 50° C. for 2 hours and then brought to 85° C. for 3 hours. The reaction mixture did not gel when heated to 85° C. and was clear after 3 hours. The sample was adjusted to pH 9.5 with 10N NaOH and poured into a baking dish. After evaporation for overnight in a convection oven at 60° C., a light brown solid was obtained. The solid was collected and ground in IKA mill to give a molecular weight reduced ethersuccinylated starch, 19.41 g. MW analysis is molecular weight weight average=57,880; molecular weight number average=50,260; polydispersity=1.15.

Non-Limiting Example of a Process for Making a Polymer Structure

Any suitable process known to those skilled in the art can be used to produce the polymer solution and/or to polymer process the polymer solution and/or to produce the polymer structure of the present invention. Non-limiting examples of such processes are described in published applications: EP 1 035 239, EP 1 132 427, EP 1 217 106, EP 1 217 107, WO 03/066942 and U.S. Pat. No. 5,342,225.

a. Making a Polymer Solution

A polymer solution comprising a reduce molecular weight ethersuccinylated polysaccharide of the present invention may be prepared using a screw extruder, such as a vented twin screw extruder, as described above in Example 3.

After the polymer solution exits the extruder, part of the polymer solution can be dumped and another part (100 g) can be fed into a Zenith®, type PEP II (Sanford N.C.) and pumped into a SMX style static mixer (Koch-Glitsch, Woodridge, Ill.). The static mixer is used to combine additional additives such as crosslinking agents, crosslinking facilitators, external plasticizers, such as water, with the polymer solution. The additives are pumped into the static mixer via PREP 100 HPLC pumps (Chrom Tech, Apple Valley Minn.). These pumps provide high pressure, low volume addition capability. The polymer solution of the present invention exhibits a Capillary Number of at least 1 and thus, is ready to be polymer processed into a polymer structure.

b. Polymer Processing the Polymer Solution into a Polymer Structure

The polymer processable polymer solution is then polymer processed into a polymer structure, such as a fiber. Non-limiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, continuous fiber producing and/or tow fiber producing. Fiber spinning may be dry spinning or wet spinning. Polymer structures produced as a result of polymer processing of a polymer solution in accordance with the present invention may be combined, such as when the polymer structures are in the form of fibers, into a fibrous structure by collecting a plurality of the fibers onto a belt or fabric.

A polymer structure and/or fibrous structure of the present invention may then be post-processed by subjecting the web to a post-processing operation. Non-limiting examples of post processing operations include curing, embossing, thermal bonding, humidifying, perfing, calendering, printing, differential densifying, tuft deformation generation, and other known post-processing operations.

c. Post-Processing the Fibrous Structure

In one example, a fibrous structure formed by processing the polymer solution according to the present invention into a plurality of fibers is subjected to a post-processing operation.

The fibrous structure of the present invention may be cured during a curing operation by subjecting the fibrous structure to a temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. In one example, the curing operation comprises passing the fibrous structure over curing plates set at about 135° C. to about 155° C. Alternative curing operations include radiation methods such as UV, e-beam, IR and other temperature-raising methods.

Other Applications of Reduced Molecular Weight Ethersuccinylated Polysaccharides The reduced molecular weight ethersuccinylated polysaccharides of the present invention may exhibit properties related to viscosity modification, solubility, film formation, polymer compatibilization, melt/solution processability, solid suspension, emulsion stabilization, cation binding, crystal growth inhibition, adhesiveness and swelling of crosslinked reduced molecular weight ethersuccinylated polysaccharides and/or as supersorbers.

Applications involving viscosity modification include thickeners to be used in foods, pharmaceuticals, latex paints, personal care products, and petroleum fracturing. For thickener applications, the reduced molecular weight ethersuccinylated polysaccharide, for example reduced molecular weight ethersuccinylated starch may have a DS of 0.05-0.7 and have a MW>500,000. Granular reduced molecular weight ethersuccinylated polysaccharide, for example reduced molecular weight ethersuccinylated starch, in the calcium form (obtained directly from the reaction) may be particularly advantageous in that it retains its granular nature until the calcium is removed either by a sequestrant or acid and then it rapidly swells.

The swelling properties of reduced molecular weight ethersuccinylated polysaccharide, for example reduced molecular weight ethersuccinylated starch, allow its use as a disintegrant in tablets. For disintegrant applications, the reduced molecular weight ethersuccinylated polysaccharide, for example reduced molecular weight ethersuccinylated starch, may have a DS of 0.05-0.5, and may be prepared from unmodified potato starch, M in Structure I above may be a mixture of H and Na, and the reduced molecular weight ethersuccinylated polysaccharide, for example reduced molecular weight ethersuccinylated starch, may be cross-linked.

For absorbent properties, the reduced molecular weight ethersuccinylated polysaccharide, for example reduced molecular weight ethersuccinylated starch, may have a DS of 0.12 and be crosslinked with crosslinker at a molar ratio of crosslinker to glucoside units of 0.007. It may be advantageous to use reduced molecular weight ethersuccinylated polysaccharide, for example reduced molecular weight ethersuccinylated starch, with a DS of 0.12 in combination with guar.

As a textile sizing agent, a reduced molecular weight ethersuccinylated polysaccharide, for example reduced molecular weight ethersuccinylated starch, may be advantageous especially if applied with imidazole. The imidazole can catalyze esterification of cellulose with reduced molecular weight ethersuccinylated polysaccharide, for example ethersuccinylated starch, during ironing and thus provide an anti-wrinkle benefit.

Reduced molecular weight ethersuccinylated polysaccharide, for example reduced molecular weight ethersuccinylated starch, may also function in papermaking as a wet and dry strength resin.

Applications involving its adhesiveness include adhesives, ceramics, dry wall joint compounds, and binders for various products.

Applications of film forming properties include coatings, textile warp sizing and paper processing. The granular reduced molecular weight ethersuccinylated starch with calcium carbonate may be particularly useful in modifying paper properties such as opacity.

Applications involving solid suspension and crystal growth inhibition properties may be particularly suitable for detergent and ore processing applications. For these applications the DS may range from about 0.1 to about 0.7 and the MW from about 10,000 to about 100,000.

Applications of the reduced molecular weight ethersuccinylated polysaccharides of the present invention include supersorbers for use in such products as diapers and/or training pants and/or feminine hygiene products and/or adult incontinence products.

Test Methods of the Present Invention
Determination of Acid Content, Degree of Ethersuccinate Substitution, and % Yield Test Method A 10 g weighed sample of ethersuccinylated polysaccharide is first converted to the fully protonated acid form and unreacted maleic acid is removed. Insoluble materials, for example low DS ethersuccinylated granular starch and cellulose, are suspended in 50 mL DI water containing 10 mL of concentrated hydrochloric acid. The granular starch and/or cellulose is collected by suction filtration and washed with water (4×100 mL) until the filtrate is at a pH of about 5. The granular starch and/or cellulose is washed with methanol (1×50 mL) and dried at room temperature to a constant weight. Granular materials which gel in water, for example ethersuccinylated guar, are converted similarly except that 1:1 v/v MeOH/water is used in place of water. Materials which are already gelled, for example ethersuccinylated destructured starch, are dissolved in 50 mL water with 10 mL concentrated hydrochloric acid added. Then methanol (100 mL) is added and the ethersuccinylated material precipitated with a wood pulp consistency. The precipitate is squeezed with a spatula to remove the supernatant. The precipitate is dissolved in 50 mL water, methanol (200 mL) added to precipitate the ethersuccinylated material, and the precipitate is squeezed with a spatula to remove the supernatant. This procedure is repeated until the supernatant has a pH of about 5 and then the precipitate is allowed to dry at room temperature to a constant weight. The moisture content is determined using a moisture balance.

A 0.4-2 g weighed sample (depending on the DS of the ethersuccinylated polysaccharide) of ethersuccinylated polysaccharide in the acid form is placed in 50 mL 2.5% sodium chloride solution and heated to boiling to effect dissolution. Then 0.1 N sodium hydroxide (20.0 mL) is added to the solution or suspension which usually immediately becomes clear. A drop of 0.5 wt % phenolphthalein solution is added and titration with 0.1N hydrochloric acid is performed.

$$\text{Acid content} = \frac{(20 - x \text{ mL } 0.1 \text{ HCl titrant} * 0.1 \text{ mmol/mL}}{\text{Wt. (g) sample titrated} * (1 - \text{moisture content})} = \text{mmol H/g sample}$$

$$\text{Degree of Substitution (for poly glucosides)} = \frac{0.081 * (\text{Acid content})}{1 - [(0.058) * (\text{Acid content})]}$$

$$\text{Theoretical Degree of Substitution} = \frac{\text{mols maleic acid in reaction}}{\text{mols of glucoside monomer units in reaction}}$$

% Yield = Actual Degree of Substitution / Theoretical Degree of Substitution

Molecular Weight Test Method (Mw and Mn and Polydispersity)

The weight average molecular weight (Mw) of a material, such as a hydroxyl polymer is determined by Gel Permeation Chromatography (GPC) using a mixed bed column. A high performance liquid chromatograph (HPLC) having the following component: Alliance 2695 Separation Module manufactured by Waters Corporation of Milford, Mass., USA, is utilized. The column is a PL gel 20 µm Mixed A column (gel molecular weight ranges from 1,000 g/mol to 40,000,000 g/mol) having a length of 600 mm and an internal diameter of 7.5 mm and the guard column is a PL gel 20 µm, 50 mm length, 7.5 mm ID manufactured by Agilent Technologies. The column temperature is 50° C. and the injection volume is 200 µL. The column heater is a Brinkmann manufactured by Metrohm USA Inc. The detectors are a Wyatt Heleos (multi-angle light scattering) and an Optilab Rex (differential refractometer), manufactured by Wyatt Technology of Santa Barbara, Calif., USA. Wyatt Astra 6 software is used. 'The mobile phase is HPLC grade dimethylsulfoxide with 0.1% w/v LiBr and the mobile phase flow rate is 0.8 mL/min, isocratic. The run time is 35 minutes.

A sample is prepared by dissolving the material in the mobile phase at nominally 3 mg of material/1 mL of mobile phase. The sample is capped then placed in an 85° C. convection oven for 60 minutes. The sample is then allowed to cool undisturbed to room temperature overnight. The sample is then filtered through a 5 μm Nylon membrane, Catalog# F-2976-30NM from ISC BioExpress of Salt lake City, Utah, into a 2 milliliter (mL) autosampler vial using a 3 mL syringe.

A check sample is prepared in a manner similar to that related to the samples described above. The check sample comprises 2 mg/mL of pullulan (Varian Laboratories) having a weight average molecular weight of 47,100 g/mol in the DMSO mobile phase. The check sample is analyzed prior to analyzing each set of samples. The light scattering detector and differential refractometer is run in accordance with our internal Standard Operating Procedure (SOP) that incorporates all procedures recommended by Wyatt Technology Corp., of Santa Barbara, Calif., USA in their following manuals: DAWN Heleos Hardware Manual, Optilab T-rEX and UT-rEX Hardware Manual and Astra VI for Windows User's Guide.

The weight average molecular weight of the sample is calculated using the detector software. A dn/dc (differential change of refractive index with concentration) value of 0.066 is used. This value was initially determined by using a series of sodium chloride solutions with different concentrations and allowing the Astra software to calculate this constant. The samples do not exhibit a single definite molar mass. They consist of mixtures of chains with different numbers of repeating units, with each chain having its own molar mass. The molar mass of a macromolecule is obtained by averaging the molar mass ($M_i$) of the different chains ($n_i$) by number (Mn) or by weight (Mw). The polydispersity is obtained by dividing the weight average molecular weight (Mw) by the number average molecular weight (Mn).

$$\tilde{M}_n = \frac{\sum M_i \cdot n_i}{\sum n_i}$$

$$\tilde{M}_w = \frac{\sum M_i \cdot w_i}{\sum w_i} = \frac{\sum M_i^2 \cdot n_i}{\sum M_i \cdot n_i}$$

$$PDI = \frac{\tilde{M}_w}{\tilde{M}_n}$$

Polysaccharide Solution and/or Composition pH

The pH of a polysaccharide and/or modified polysaccharide, such as ethersuccinylated polysaccharide, solution and/or composition, such as a reaction mixture, is determined by adding 25 mL of the polysaccharide and/or modified polysaccharide, such as ethersuccinylated polysaccharide, solution and/or composition, such as a reaction mixture, to 100 mL of deionized water, stirring with a spatula for 1 minute and measuring the pH.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for reducing the molecular weight of an ethersuccinylated polysaccharide derived from an unmodified polysaccharide comprising native corn starch wherein the process comprises the step of reacting an ethersuccinylated polysaccharide with an acid to achieve a pH of the reaction mixture of from about 2 to about 6; and the step of reacting the unmodified polysaccharide with an α, β-unsaturated dicarboxylic acid or salt thereof to produce an ethersuccinylated polysaccharide comprising an ethersuccinate moiety having the formula:

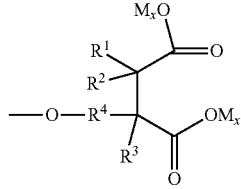

wherein $R^1$, $R^2$ and $R^3$ are independently selected from H, branched or linear $C_1$-$C_4$ alkyl and mixtures thereof; $R^4$ is $(CH_2)_y$; M is independently selected from H, cations and mixtures thereof; x is greater than 0 but less than or equal to 1; y is 0 or 1;

under conditions such that at least a partially protonated reduced molecular weight ethersuccinylated polysaccharide is obtained.

2. The process according to claim 1 wherein the pH of the reaction mixture is from about 2.5 to about 6.

3. The process according to claim 1 wherein the acid comprises an acid that is capable of forming a water-soluble salt within the reaction mixture.

4. The process according to claim 3 wherein the water-soluble salt comprises a cation selected from the group consisting of: calcium, sodium, ammonium, and mixtures thereof.

5. The process according to claim 1 wherein the acid is selected from the group consisting of: hydrochloric acid, acetic acid, maleic acid, carbonic acid, nitric acid, and mixtures thereof.

6. The process according to claim 1 wherein the reaction occurs at a temperature of from about 30° C. to about 170° C.

7. The process according to claim 1 wherein the at least partially protonated reduced molecular weight ethersuccinylated polysaccharide exhibits a weight average molecular weight of less than 12,000,000 g/mol as measured according to the Molecular Weight Test Method.

8. The process according to claim 1 wherein the at least partially protonated reduced molecular weight ethersuccinylated polysaccharide exhibits a polydispersity of less than 6 as measured according to the Molecular Weight Test Method.

9. The process according to claim 1 wherein the α, β-unsaturated dicarboxylic acid or salts thereof comprises an alkene dicarboxylic acid or salt thereof.

10. The process according to claim 9 wherein the alkene dicarboxylic acid is selected from the group consisting of: maleic acid, itaconic acid, citraconic acid and mixtures thereof.

11. The process according to claim 1 wherein the step of reacting the unmodified polysaccharide with an α, β-unsaturated dicarboxylic acid or salt thereof occurs in the presence of an alkaline earth metal salt.

12. The process according to claim 11 wherein the alkaline earth metal salt comprises $Ca(OH)_2$.

13. The process according to claim 11 wherein the ratio of the mmoles of excess alkaline earth metal salt per gram of unmodified polysaccharide is 0.3 mmol/g or greater.

14. The process according to claim 13 wherein the ratio is from about 0.3 to about 0.7 mmol/g.

15. The process according to claim 1 wherein the unmodified polysaccharide is selected from the group consisting of: starch, chitosan, cellulose, and mixtures thereof.

16. The process according to claim 1 wherein the ethersuccinylated polysaccharide comprises ethersuccinylated starch.

17. The process according to claim 1 wherein the reduced molecular weight ethersuccinylated polysaccharide comprises reduced molecular weight ethersuccinylated starch.

\* \* \* \* \*